United States Patent
Olashuk

(10) Patent No.: US 6,679,273 B2
(45) Date of Patent: *Jan. 20, 2004

(54) SURFACE CLEANSING OF CONTINUOUS-STRIP STEEL FOR HOT-DIP METAL COATING AND APPARATUS FOR DECREASING SURFACE CLEANSING SOLUTION REQUIREMENTS

(75) Inventor: Kenneth R. Olashuk, Follansbee, WV (US)

(73) Assignee: Weirton Steel Corporation, Weirton, WV (US)

( * ) Notice: Subject to any disclaimer, the term of this patent is extended or adjusted under 35 U.S.C. 154(b) by 131 days.

This patent is subject to a terminal disclaimer.

(21) Appl. No.: 09/910,031

(22) Filed: Jul. 23, 2001

(65) Prior Publication Data

US 2001/0054432 A1 Dec. 27, 2001

Related U.S. Application Data

(63) Continuation-in-part of application No. 09/121,109, filed on Jul. 23, 1998, now Pat. No. 6,264,757, which is a continuation-in-part of application No. 08/794,783, filed on Feb. 3, 1997, now Pat. No. 5,830,282, which is a continuation-in-part of application No. 08/445,530, filed on May 23, 1995, now Pat. No. 5,599,395.

(51) Int. Cl.[7] ................................. B08B 1/02

(52) U.S. Cl. .................. 134/10; 134/15; 134/64 R; 134/109; 134/118; 134/67; 134/86; 134/405; 134/419; 134/610; 134/623

(58) Field of Search .................. 134/10, 15, 64 R, 134/109

(56) References Cited

U.S. PATENT DOCUMENTS

| | | | | |
|---|---|---|---|---|
| 4,175,039 A | * | 11/1979 | Fisher | 210/747 |
| 5,830,282 A | * | 11/1998 | Olashuk | 134/10 |
| 6,264,757 B1 | * | 7/2001 | Lester et al. | 134/15 |

* cited by examiner

Primary Examiner—Randy Gulakowski
Assistant Examiner—Saeed Chaudhry
(74) Attorney, Agent, or Firm—Shanley and Baker

(57) ABSTRACT

Cold-reduced flat-rolled low carbon steel strip is surface cleansed of ferromagnetic contaminants including iron fines, iron oxide particulate and associated debris which result from gauge-reduction operations. Such ferromagnetic contaminants are permanently removed from the strip steel hot-dip galvanizing system by dynamically concentrating such contaminant which are flushed to a magnetically-assisted particle separation container, formed from paramagnetic sheet material, which retains such contaminants, while cleansing solution at a desired purity level, is returned to the surface cleansing system; with sedimentation tank means providing for diminishing waste disposal concerns by separating sludge and recycling liquid.

4 Claims, 3 Drawing Sheets

SURFACE CLEANSING OF CONTINUOUS-STRIP STEEL FOR HOT-DIP METAL COATING AND APPARATUS FOR DECREASING SURFACE CLEANSING SOLUTION REQUIREMENTS

RELATED APPLICATIONS

This application is a continuation-in-part of co-owned and U.S. patent application Ser. No. 09/121,109, filed Jul. 23, 1998, now U.S. Pat. No. 6,264,757 which was a continuation-in-part of and co-owned application Ser. No. 08/794,783, filed Feb. 3, 1997, entitled CONTINUOUS PARTICLE SEPARATION OPERATIONS (now U.S. Pat. No. 5,830,282) which was a continuation-in-part of and co-owned application Ser. No. 08/445,530, filed May 23, 1995, entitled APPARATUS FOR CONTINUOUS FLAT-ROLLED STEEL STRIP CLEANSING AND FINISHING OPERATIONS (now U.S. Pat. No. 5,599,395).

INTRODUCTION

This invention relates to finishing operations involving hot-dip zinc spelter coating strip steel. In its more specific aspects this invention is concerned with minimizing aqueous requirements for caustic cleansing solution supply purposes; and, with substantially-eliminating aqueous waste discharge from surface-cleansing operations.

OBJECTS OF THE INVENTION

An important object is to provide for continuing uniform surface cleansing by maintaining uniform purity-level standards for the cleansing solution.

Another object is to enable minimizing of waste disposal, in particular, substantially-eliminating contaminated waste water disposal.

DETAILED DESCRIPTION

Contaminants, to be separated from caustic surface cleansing solution during preparation of flat-rolled steel for finishing operations, comprise iron fines, particulate-iron oxide and associated debris. Purity levels for the cleansing solution are measured in parts per millions (ppm) of iron fines.

In continuous strip finishing mills, large surface areas of strip are handled per unit time; and, the solid contaminant quantities of iron fines from thickness gauge cold reduction operations, iron-oxide largely resulting from hot rolling operations, and associated debris-resulting from the use of cold rolling oil, have in the past, required dumping large-capacities of contaminated surface cleansing solutions. Contaminated cleansing solution, from large capacity facilities have required periodic dumping of large amounts of contaminated solution; which must then be fully replenished so as to involve an interruption in operations. Dependent on production deadlines there can be a tendency to allow "purity levels" to rise significantly above a desired level.

Also, any requirement to dump those large contaminated quantities, as taught herein, results in non-uniform surface cleansing during line operation; which adversely effects the hot dip coating operations, the hot-dip coating apparatus, and is also detrimental to continuously annealing equipment located in-line between the surface cleansing-operation and the hot dip coating apparatus.

The present invention provides uniform surface cleansing solution and solves waste disposal problems now being experienced by mills in certain localities.

Figure 1:
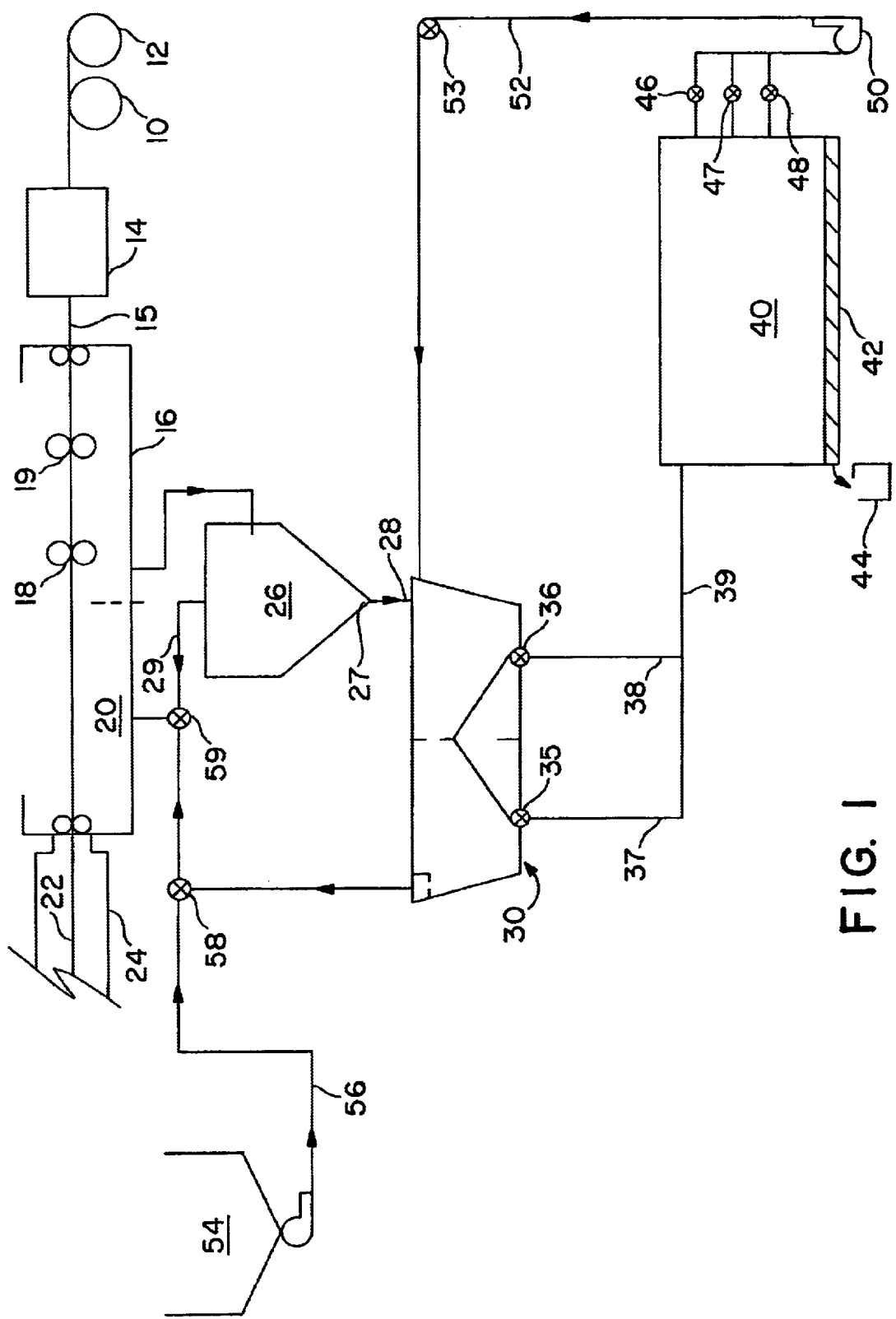
FIG. 1 is a schematic general arrangement view for describing method and apparatus combinations of the invention.

In the embodiment of FIG. 1, leading and trailing edges of cold rolled strip, from coils 10 and 12, are trimmed and directed, for joining of such trimmed edges, into strip welder 14, so as to maintain continuous strip 15 during hot dip zinc-spelter coating finishing operations.

For surface cleansing, continuous strip 15 is directed into a cleansing tank means 16 having a large capacity for surface cleansing solution.

Surface brushing stations 18 and 19 can augment the action of the caustic cleansing solution 20, in the cleansing tank means 16.

Strip 22 travels from cleansing tank 16 into continuous annealing furnace 24, for heating to a temperature of about 1000° F. in a non-oxidizing, preferably mildly-reducing, atmosphere to prevent surface oxidation; that atmosphere continues for subsequent introduction of the strip, at about 900° F., into a hot-dip zinc-spelter coating bath (not shown).

Combinations of apparatus for maintaining desired purity level surface-cleansing solution are shown, and the combinations of steps are described, in relation to FIG. 1.

During the surface cleansing operation, solution 20 is continuously, and controllable, withdrawn from holding means 16, and directed, for example, by conduit 25 of FIG. 1 into a dynamic action continuous filter, such as cyclone 26. The centrifugal force of cyclone apparatus 26 directs contaminants toward the side walls for accumulation and continuous-flushing removal at outlet 27, through conduit 28.

The filtrate, from which significant percentages of contaminants are separated, is returned through conduit 29 to facility cleansing tank means 16.

To assist compliance with restrictive sewer-disposal provisions, flushed contaminants are directed, in accordance with the invention, through conduit 28 to magnetically-assisted separator unit 30 (FIG. 1). A more detailed view, of the circulating system arrangement is shown in FIG. 2; and, also of the magnetically-assisted separator embodiment of the invention which is shown in FIG. 3.

Referring to the schematic general-arrangement view of FIG. 1, magnetically-separated contaminants are retained in separator 30; and, the purified liquid portion of the material flushed from cyclone 26 returned, through conduit 32, to cleansing tank means 16.

Figure 2:
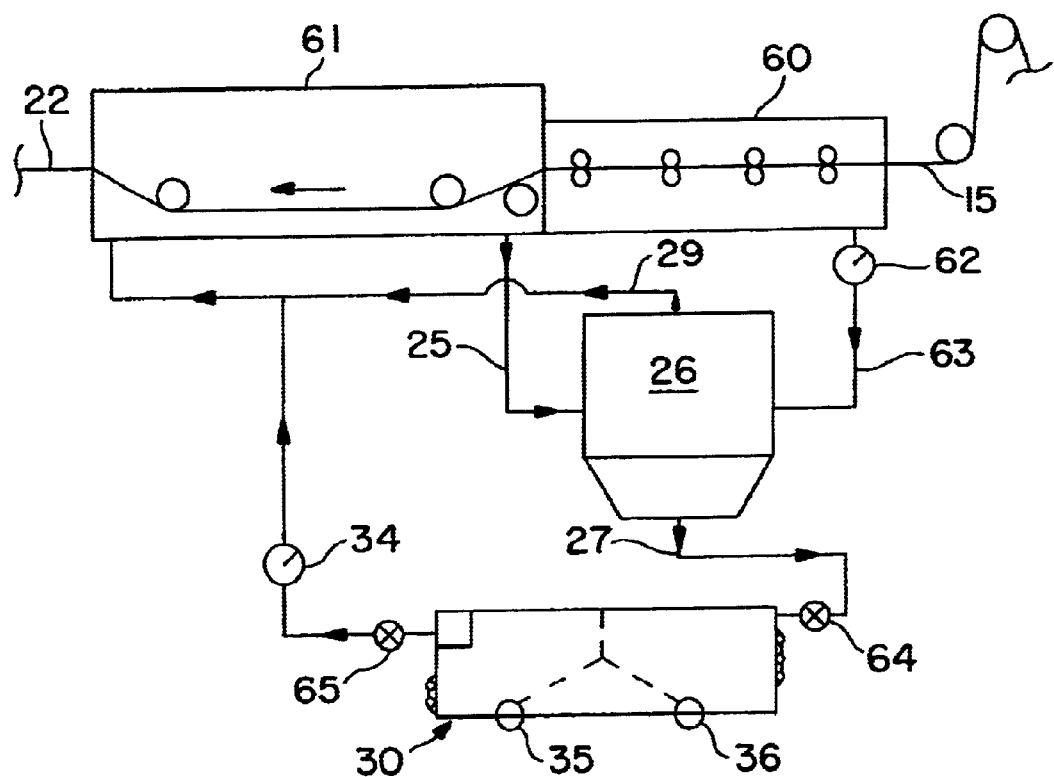
FIG. 2 is a more detailed view of the circulating system for surface cleansing solution of the invention.
Figure 3:
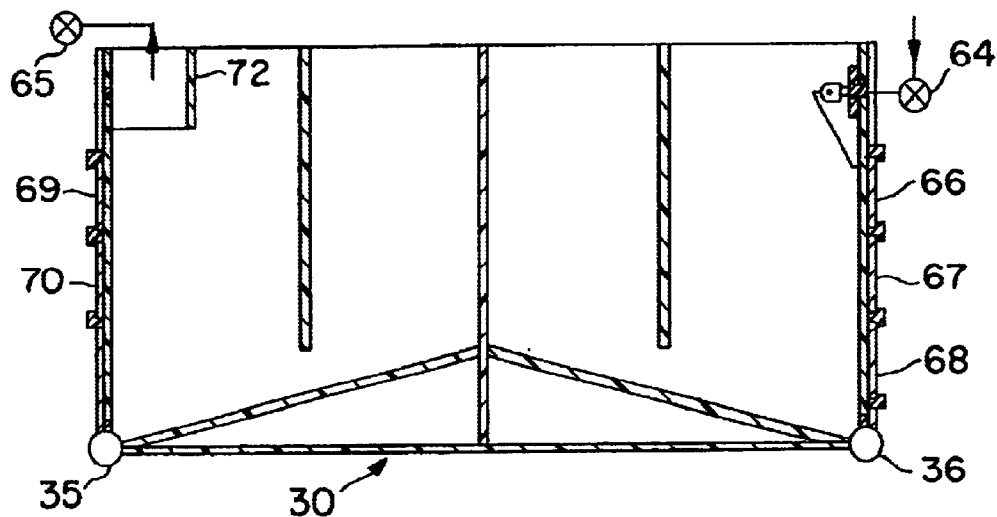
FIG. 3 is a more detailed view of a magnetically-assisted particle separator embodiment of the invention.

Purity level, of the returning liquid is measured at the sampling station shown by means of gauge 34 in FIG. 2.

Contaminated solution from separator unit 30 can be released promptly, including by washing the interior of that, unit. Drain valves 35, 36, direct contaminated discharge from unit 30, through conduits 37, 38 and 39 of FIG. 1, for sludge separation.

Capacities are selected such that the surface-cleansing operation need not be interrupted for removal of contaminants. Magnetically-assisted particle separator 30 has a capacity equal to about ten percent of the capacity of the surface-cleansing facility 16; and sludge-separating sedimentation tank 40 of FIG. 1 has about thirty percent more capacity than that of separator unit 30.

Semi-solid sludge is transferred from sedimentation tank 40, by auger 42, into drum containers, such as 44 of FIG. 1. Such sludge can be directed to a sintering plant for forming pellets for recycling in an iron-production unit and other recycling measures; or, can be directed for solid waste-site disposal.

The solution in sedimentation tank 40 is decanted, from selected height-levels of tank 40; starting at the uppermost level, by use of valves 46, 47, 48 each with associated conduits, as shown in FIG. 1.

Sludge is concentrated for removal by auger 42, with about eighty-five to about ninety-five percent of the liquid received from magnetically-assisted separator unit 30, being sufficiently free of sludge for recycling through the magnetically assisted separator 30 and return to surface cleansing. Pump 50 (FIG. 1), by means of conduit 52 and control valve 53, returns surface cleansing liquid, as shown, from selected levels designated by valves 46, 47, and 48. Separator unit 30 purifies decanted liquid for recycled use in the surface cleansing system.

Also, caustic, and fresh caustic cleansing solution, to compensate for losses due to evaporation and/or product "drag-out", are augmented from source 54 (FIG. 1) through conduit 56. Valves 58, 59 are positioned to direct solution from source 54 and to return purified liquid from separator unit 30, and to return the filtrate from cyclone 26 to selected locations of the surface cleansing facility, along the elongated holding means 16.

In FIG. 2, like reference numbers are used, where possible, in describing the solution circulation system in more detail. Strip 15 is fed into the surface cleansing location, which combines surface brushing components in portion 60 and added cleansing solution in wash portion 61. Surface-cleansed strip 22 is then directed for further in-line processing. The combined cleansing solution capacity of solution in portions 60, 61 is about five thousand gallons.

Purity level of the surface cleansing liquid in ppm iron fines can be measured at gauge sampling locations 62, 63 and 64. One method is to remove contaminated solution at strip entry ends of elongated tank portions 60, 61; and, to return desired purity-level solution to the strip exit area of portion 61, for counterflow, in relation to the strip, in the surface cleansing system. Such counter-flow can significantly diminish particle quantities carried out, by the strip, into the annealing furnace.

Valves 65 and 66 (FIG. 2), at the entry and exit of particle separator 30, enable isolation of that particle separator for drainage into sedimentation tank 40 (FIG. 1).

The magnetically assisted particle separator 30 (shown in FIGS. 1 and 2), utilizes paramagnetic polymer sheet material in forming the interior and exterior walls of FIG. 3, such as polypropylene which can be bonded together to provide the desired capacity and direction of flow of solution being decontaminated. Permanent magnets are supported on polymer coated plain carbon steel, or a paramagnetic stainless steel, frame so as to capable of being pivotally-rotated, as mounted on an exterior wall to terminate the magnetic flux action internally, for assisting in removal of contaminated contents.

As shown in FIG. 3, permanent magnets are mounted in rows 66, 67, 68, 69 and 70 along the longitudinal end of separator unit 30; and, can be mounted along side walls for higher separation capacity than that of the specific embodiment being disclosed.

Pivotally-mounting the magnets externally, enables those magnets to be readily moved into an orientation at an angle to the wall surface, such that lines of magnetic flux are no longer acting internally of unit 30.

Permanent magnets can be housed internally between polymer sheets at centrally-located wall petitions; such internal mounted magnet would not be pivotally mounted; however, contaminants retained by such magnets can be washed from adjacent polymer surfaces using pressurized water supply available at mill sites. And, such pressurized water supply can be used to augment removal from the internal wall surfaces which have externally mounted magnets.

Floatation froth detainer 72 at the exit end of unit 30, prevents floating debris from being pumped into the surface cleansing system. The capacity of unit 30 is about five hundred gallons; and, can be withdrawn simultaneously at both longitudinal end valves 35, 36; or from a single longitudinal end portion of unit 30 by using a single valve separately.

Magnetically-assisted separator 30 can be drained and washed-down promptly, at any time, without interrupting surface cleansing operations. Typically, it would be drained when the return solution, at sampling gauge 32, shown in both FIGS. 1 and 2, exceeded a desired purity level, such as about fifty ppm iron fines. However, unit 30 can be drained promptly at any time, and would ordinarily be drained, and circulation continued, during regular periodic maintenance periods for the processing line. Continuing the solution circulation system of FIG. 2 at such time decreases the level of contaminant fines well below a desired operating maximum of about fifty ppm.

Figure 4:
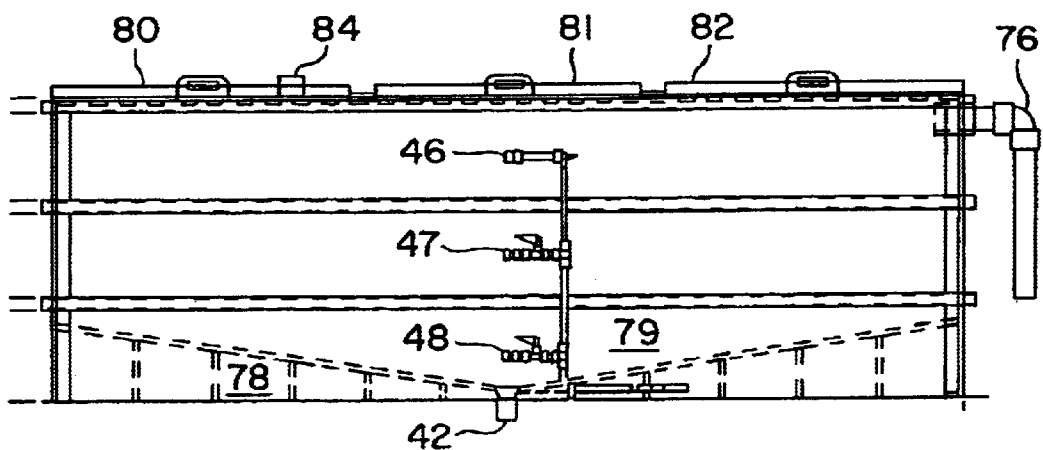
FIG. 4 is side-elevational view of the sludge-separator sedimentation tank of the invention.
Figure 5:
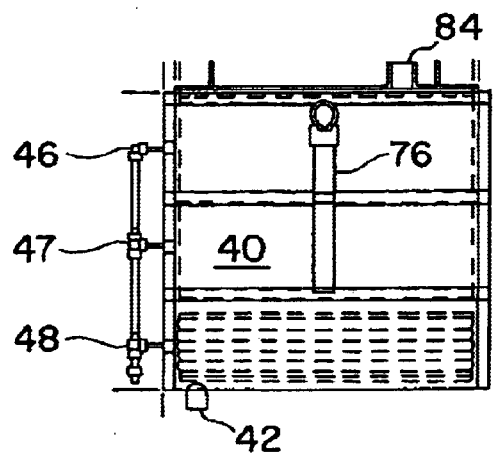
FIG. 5 is an end elevated view of the tank of FIG. 4.

Contaminated cleansing solution drained, through valves 35, 36, of magnetically-assisted separation unit 30, is directed to inlet pipe 76, forentering into a polypropylene sludge-separation sedimentation tank 40, shown in more detail in FIGS. 4 and 5. A polypropylene auger 42 is located at the intersection of floor panels 78, 79 of sedimentation tank 40, such panels are angled downwardly for semi-solid sludge to auger 42 for removal.

Liquid decanting valve means 46, 47, 48 are each shown at its respective decanting level in FIGS. 4 and 5. Sedimentation tank 40 is covered by cover plates shown at 80, 81, 82 in FIG. 4; a vent port 84 is provided as shown in FIGS. 4 and 5.

The magnetically-assisted particle separator 30, sedimentation tank 40, and auger 42 are preferably fabricated from an engineered polymer, such as polypropylene.

The cleansing caustic is available from Elf Autochem North America, Inc., 2375 State Road, Cornwall Heights, Pa. 19020; and separation equipment 26, for dynamic flow separation of solids and liquids, is available from Lakos Separators USA, 1911 North Helm Avenue, Fresno, Calif. 93727; interval or continuous flushing of purged material is available on such units.

For purposes of measuring iron fines in ppm, five thousand gallons of cleansing solution are equal to slightly more than six hundred thousand ounces of solution. The embodiment being disclosed can maintain a uniform low level of less than about thirty ppm iron fines, by using six hundred gauss magnets, supplied by Eriez Magnetics, of Erie, Pa., under the heading of "Extra Power 600". Added strength magnets extending to about fifteen hundred gauss are available.

Applicable data for continuous-strip zinc spelter cleansing operations, for a continuous hot-dip coating line, are set forth below:

TABLE I

| | |
|---|---|
| Surface Cleansing Solution Holding and Scrubbing Tank 16 | about 5,000 gals |
| Withdrawal Rate of Dynamic Filter Apparatus 26 | about 2,700 gals/hr |
| Rate of Filtrate Return from 26 | about 2,300 gals/hr |
| Magnetically-Asserting Separator 30, Capacity | about 500 gals |
| Rate Flushed Purged From 26 | about 400 gals/hr |
| Magnet Field Strength | 600 gauss per magnet |
| Number of Magnets Per Row | 4 |
| Total Magnets on Entrance Side Endwall | 12 |
| Total Magnets on Exit Side Endwall | 8 |
| Capacity of Sludge-Separation Sedimentation Tank 40 | about 650 gals. |

While specific materials, capacities, flow rates and other data have been set forth for purposes of describing an embodiment of the invention, it should be recognized that in the light of the above teachings, those specifics can be changed without departing from the principles of the invention; therefore in determining the scope of patentable subject matter, references should be made to the appended claims, as well as the above description.

What is claimed is:

1. Method for surface cleansing of flat-rolled continuous-strip steel in preparation for in-line heat treatment and hot-dip metal coating, comprising
    A. providing for extended-length submerged travel of continuous-strip steel, through a surface cleansing facility with solution holding means for dislodging surface contaminants, consisting essentially of iron fines, iron oxide particulate and associated debris, while such strip is moving in the direction of its length at a desired line speed commensurate with subsequent in-line processing requirements;
    B. selecting a purity level range for such surface cleansing solution for sustaining desired surface cleansing;
    C. continuously regenerating such cleansing solution, during such continuous in-line operations, to establish a purity level within a selected part-per-million range for solid particulate, by:
        (i) controllably withdrawing cleansing solution from such facility holding means at a predetermined rate,
        (ii) directing such withdrawn cleansing solution to dynamic means for physically separating such contaminants, so as to obtain filtrate within such selected purity-level range,
        (iii) returning such filtrate to such holding means for continuing use in dislodging such surface contaminants from such submerged continuous-strip;
    D. providing for magnetically-assisted contaminant separation within paramagnetic container means;
        (i) defining such paramagnetic container means to have significantly less capacity than such cleansing-facility holding means,
        (ii) presenting at least one extended-area wall having an internal surface and an accessible external surface of such paramagnetic container means,
        (iii) positioning permanent magnet means for establishing lines of magnetic flux acting internally of such contaminant paramagnetic container, so as to attract and retain iron fines, iron oxide particulate and associated debris, by
        (iv) supporting such magnet means contiguous to such an accessible external wall surface, opposite to such at least one internal wall surface;
    E. flushing such physically separated materials by liquid selected from the group consisting of
        (i) contaminated cleansing solution, and
        (ii) an aqueous liquid compatible with such cleansing solution,
    F. directing such flushed contaminants into such paramagnetic container means for attraction and retention of such contaminants by such lines magnetic flux acting internally of such separator structure, while
    G. returning flushing liquid, which has been subjected to such lines of magnetic flux, to obtain a desired parts-per-million purity level within such selected range for cleansing solution in such in-line holding means;
    H. periodically discharging such magnetically-accumulated contaminants and flushing liquid from such paramagnetic container means into sedimentation tank means for minimizing waste disposal concerns; by,
    I. providing for returning liquid from selected levels within such sedimentation tank means, to the paramagnetic container, for recycled use in removing surface contaminants, and
    J. providing auger means disposed for removing semi-solid contaminants from such sedimentation tank for selection from the group consisting of iron particulate utilization and solid waste site disposal.

2. The process of claim 1, including
    providing for such submerged travel of surface-contaminated strip through a holding means having a capacity of about ten times the capacity of such paramagnetic container means, and
    providing a sedimentation tank capacity which exceeds such container means so as to provide for providing removal of the capacity of such paramagnetic container means for separation of solid contaminants and retain such solution.

3. The method of claim 2, in which such cleansing solution comprises a caustic alkali detergent cleansing solution, further including
    (a) replacing such alkali cleansing solution so as to make up losses due to evaporation and in-line operations strip travel losses, while
    (b) avoiding interruption of in-line processing operation for removal or replacement of large quantities of such cleansing solution, from such system.

4. Apparatus for decontaminating caustic surface-cleansing solution, for iron-bearing product, during mill processing prior to in-line heat treatment, comprising
    A. means supplying a surface-cleansing facility with solution for in-line cleansing of iron-bearing work product, including:
        (i) holding means for such surface-cleaning, solution with a capacity which is correlated with production capacity of such mill processing;
        (ii) means for selecting an iron content purity level range for such surface-cleaning solution during mill processing;
    B. means for controlling withdrawal rate of such cleansing solution from such surface-cleansing holding means;
    C. means for dynamically filtering iron fines, iron oxide particulate and associate debris from such cleansing solution and means for returning filtrate to such holding means, D. means for flushing separated contaminant from such dynamic filtering means and means for directing such withdrawn solution to container means for magnetically separating iron fines, iron oxide particulate, and associated debris with such container means being formed from paramagnetic sheet material which is substantially transparent to lines of magnetic flux, E. permanent magnet means located for establishing lines of magnetic flux acting internally of such container means for magnetically attracting and, at least temporarily, retaining such iron-fines, particulate iron oxide, and associated debris within such paramagnetic container means, F. means for returning solution from which such solid contaminants have been removed and retained, to such holding means so as to maintain a purity level within such selected range;

G. means for periodically discharging such solid contaminants and contaminated solution from such paramagnetic container means when such returning solution exceeds such selective range; and H. means for directing such contaminants into a sedimentation tank means, for diminishing waste disposal concerns including:
  (i) liquid decanting means for returning solution, from selected levels of such sedimentation tank, to such container means, and
  (ii) auger means for removing settled sludge contaminants.

* * * * *